United States Patent
Lam et al.

(10) Patent No.: US 10,852,412 B2
(45) Date of Patent: Dec. 1, 2020

(54) BULLET STATE ESTIMATOR USING OBSERVER BASED DYNAMIC SYSTEM

(71) Applicant: BAE SYSTEMS Information and Electronic Systems Integration Inc., Nashua, NH (US)

(72) Inventors: Quang M. Lam, Fairfax, VA (US); Ryan P. Carney, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 288 days.

(21) Appl. No.: 16/163,698

(22) Filed: Oct. 18, 2018

(65) Prior Publication Data

US 2020/0124714 A1    Apr. 23, 2020

(51) Int. Cl.
- G01S 13/58 (2006.01)
- G01L 5/14 (2006.01)
- G01S 13/44 (2006.01)

(52) U.S. Cl.
CPC .............. *G01S 13/588* (2013.01); *G01L 5/14* (2013.01); *G01S 13/4427* (2013.01)

(58) Field of Classification Search
CPC ....... G01S 13/588; G01S 13/4427; G01L 5/14
USPC ......................................................... 342/104
See application file for complete search history.

(56) References Cited

U.S. PATENT DOCUMENTS

| | | | | |
|---|---|---|---|---|
| 4,060,809 A * | 11/1977 | Baghdady | ............... | G01S 1/40 342/451 |
| 4,333,106 A * | 6/1982 | Lowe | ................... | F41G 3/2611 348/142 |
| 4,783,744 A * | 11/1988 | Yueh | .................... | F41G 7/30 235/412 |
| 5,596,509 A * | 1/1997 | Karr | ......................... | F41J 5/10 235/411 |
| 6,285,971 B1 * | 9/2001 | Shah | ..................... | G05B 13/04 700/38 |

(Continued)

FOREIGN PATENT DOCUMENTS

WO        2007/016098 A2    2/2007

OTHER PUBLICATIONS

"Heterodyne", https://en.wikipedia.org/wiki/Heterodyne, known of at least since Apr. 24, 2019.

(Continued)

*Primary Examiner* — Peter M Bythrow
*Assistant Examiner* — Nuzhat Pervin
(74) *Attorney, Agent, or Firm* — KPIP Law, PLLC (57) ABSTRACT

Poor BSE estimation accuracy resulting from conventional Extended Kalman Filtering (EKF) approaches using RF OI sensors mounted on the ground as a remote bullet tracking sensor motivated the design and development of the present disclosure. The observer based BSE removes EKF process noise (state noise) and measurement noise (OI sensor noise) covariance matrices selection and tuning which have been long recognized by the estimation community as a time consuming process during the design stage; requires no consideration of interactions when having the control input signal as part of the state propagation equation; and provides a significant improvement in velocity estimation accuracy, in some cases to less than 1 m/s errors in all axes, thereby meeting the miss distance requirement with amble margin.

3 Claims, 7 Drawing Sheets

--- receiving, via a radio frequency sensor located on a projectile, waveforms from a ground-based radio frequency transmitter (30)

calculating an azimuth angle, an elevation angle, and a range measurement for the projectile in relation to one or more targets during flight to create measurement vectors (32)

converting the measurement vectors into projectile position vectors including 3-D position, 3-D velocity, and 3-D acceleration components expressed in a Cartesian coordinate system (34)

eliminating a Jacobian term, thereby providing a linear time invariant (LTI) solution for the bullet state estimation having a velocity error of less than 1 m/s (36)

(56) References Cited

U.S. PATENT DOCUMENTS

| | | | | |
|---|---|---|---|---|
| 6,573,486 | B1* | 6/2003 | Ratkovic | F41G 7/346 244/3.15 |
| 7,741,991 | B1* | 6/2010 | MacBean | G01S 13/685 342/62 |
| 8,120,526 | B2* | 2/2012 | Holder | G01S 13/003 342/140 |
| 8,275,544 | B1* | 9/2012 | Wells | G01S 17/86 701/501 |
| 8,854,252 | B2* | 10/2014 | Holder | G01S 13/003 342/107 |
| 9,243,916 | B2* | 1/2016 | Roumeliotis | G06F 3/0346 |
| 9,401,741 | B2* | 7/2016 | Holder | H04B 1/7097 |
| 9,696,418 | B2* | 7/2017 | Holder | G01S 13/003 |
| 2005/0114023 | A1* | 5/2005 | Williamson | G01S 19/47 701/472 |
| 2012/0316819 | A1* | 12/2012 | Martell | G01S 13/878 702/94 |
| 2013/0092785 | A1* | 4/2013 | Tournes | F41G 7/2213 244/3.2 |
| 2016/0349026 | A1* | 12/2016 | Fairfax | F41G 7/36 |
| 2017/0314892 | A1* | 11/2017 | Holder | F41G 7/303 |

OTHER PUBLICATIONS

"Interferometry", https://en.wikipedia.org/wiki/Interferometry, known of at least since Apr. 24, 2019.

Monopulse radar, https://en.wikipedia.org/wiki/Monopulse_radar, known of at least since Apr. 24, 2019.

"Pulse-Doppler signal processing", https://en.wikipedia.org/wiki/Pulse-Doppler_signal_processing, known of at least since Apr. 24, 2019.

"Undersampling", https://en.wikipedia.org/wiki/Undersampling, known of at least since Apr. 24, 2019.

Armin W. Doerry, "SAR Processing with Stepped Chirps and Phased Array Antennas", Sandia Report, Sandia National Laboratories, Printed Sep. 2006, Albuquerque, NM.

M. Mallick et al., "Angle-only filtering in 3D using Modified Spherical and Log Spherical Coordinates", 14th International conference on Information Fusion, Chicago, Illinois; pp. 1905-1912, Jul. 5-8, 2011.

K. Radhakrishnan et al., "Bearing only Tracking of Maneuvering Targets using a Single Coordinated Turn Model", International Journal of Computer Applications (0975-8887) vol. 1—No. 1, pp. 25-33; 2010.

* cited by examiner

BULLET STATE ESTIMATOR USING OBSERVER BASED DYNAMIC SYSTEM

FIELD OF THE DISCLOSURE

The present disclosure relates to munitions' command guidance scheme and more particularly to an improved bullet state estimator (BSE) that uses an observer based estimation system to reconstruct the bullet state vector in-flight using active sensor measurements as remote sensing.

BACKGROUND OF THE DISCLOSURE

Previous systems by Applicant utilize a bullet state estimator (BSE) with an Extended Kalman Filter (EKF)-based approach to process the sensor measurements (i.e., two angles and range information from a radio frequency orthogonal interferometry (RF/OI) sensor to a bullet in flight) to fully reconstruct the trajectory motion of the bullet from those measurements. The EKF-based design accounts for the BSE state uncertainty via a G·w term but does not include the control term, B·u, described in more detail in equation (1) of this document. Due to lack of the control signal shaping term the actual trajectory of the bullet, the EKF based BSE vector's estimation accuracy is not as accurate as that produced by the observer based BSE, especially the velocity component.

Wherefore it is an object of the present disclosure to overcome the above-mentioned shortcomings and drawbacks associated with conventional EKF based BSE. The present observer based BSE design has produced favorable results over previous EKF based design approach while reducing the computational processing load and offering better velocity estimation accuracy needed for a successful engagement mission.

SUMMARY OF THE DISCLOSURE

The present disclosure of an observer based estimation solution for weapon platform's BSE tends to be more attractive and robust than the conventional Extended Kalman Filter (EKF) based approach due to the following two primary reasons. The first is it is less computationally intensive in producing a highly accurate BSE since the observer based BSE gain matrix is precomputed rather than recursively calculated at every sample of the filtering process as in the EKF method. The second is there is no intensive labor required in tuning the EKF process noise and measurement noise covariance matrices (i.e., [Q and R]).

One aspect of the present disclosure is that the systematic approach developed herein to precompute the observer based BSE gain matrix (L, eq. (8)) while employing two pre-weighting process noise matrices captured in equations (9) and (10) (i.e., $W_0$ & $W_1$ which represent the nominal process noise covariance and the incremental process noise covariance needed for L calculation).

In one embodiment of the system the observer gain matrix L is only required to be computed one time but its effectiveness and robustness against sensor noise and state noise uncertainties are suitable to produce an exceptionally accurate BSE allowing the guidance law to guide the bullet onto a collision course with the target and engage the target at an acceptable miss distance (MD). Velocity estimation accuracy enhancement (over the conventional EKF's velocity estimation) is another significant contribution of this present disclosure and considered one key factor in producing an acceptable MD performance.

One aspect of the present disclosure is a method for observer-based bullet state estimation, comprising receiving, via a radio frequency sensor located on a projectile, waveforms from a ground-based radio frequency transmitter; calculating an azimuth angle, an elevation angle, and a range measurement for the projectile in relation to one or more targets during flight to create measurement vectors; converting the measurement vectors into projectile position vectors including 3-D position, 3-D velocity, and 3-D acceleration components expressed in a Cartesian coordinate system; and eliminating a Jacobian term, thereby providing a linear time invariant (LTI) solution for the bullet state estimation having a velocity error of less than 1 m/s.

One embodiment of the method for observer-based bullet state estimation is wherein elimination of measurement noise and process noise covariance matrices is part of the estimation process.

Another embodiment of the method for observer-based bullet state estimation is wherein the azimuth angle, the elevation angle, and the range measurements are pre-converted to Cartesian coordinates as follows: $p_x = r \cos\theta \cos\varphi$, $p_y = r \cos\theta \sin\varphi$, and $p_z = r \sin\theta$.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

It is understood that a guided munition is intended to precisely hit a specific target, to minimize collateral damage and increase the successful destruction of intended targets. Because the damage effects of explosive weapons generally decreases with distance due to an inverse cube law, even modest improvements in accuracy (e.g., reductions in miss distance) enable a target to be attacked with fewer or smaller munitions. Thus, even if some guided munitions miss the target, fewer air crews are put at risk and the harm to civilians and the amount of collateral damage may be reduced.

One embodiment of the observer based BSE design estimates the in-flight bullets' 3-D dynamic state vector (i.e., 3-D position, 3-D velocity, and 3-D acceleration) by processing the RF based remote sensor measurements implemented on the ground. The measurements are generated using the RF transmitting/receiving principle with transmitters residing on a platform (e.g., a tank) while the receiver is implemented at the tail end of the munition.

In one embodiment of the system of the present disclosure, the munition is guided using radio frequency (RF) radiation or the like. In one case, an Orthogonal Interferometry (OI) RF illuminator is located behind the weapon system (e.g., at 0 to 100 km) and a respective RF/OI receiver is mounted on an asset (e.g., munition) which receives the OI waveform. In this example, an RF/OI sensor observes the projectile or bullet in flight and generates the following three measurements: azimuth angles, elevation angles, and range as its outputs.

The primary goal in guidance is to reconstruct the full nine state vectors (i.e., 3D Pos, 3-D Vel, 3-D Acc) in Cartesian coordinates by processing the RF/OI sensor's measurements described above. An Extended Kalman Filter (EKF) approach developed and implemented by Applicant as a bullet state estimator (BSE) exhibited suboptimal performance in estimating the bullet's velocity and acceleration vectors. The EKF based BSE's suboptimal performance was, in part, due to the unaccountability of the bullet control vector. While this is modifiable via the EKF approach; it is much cleaner to employ the present observer-based design approach because the process noise matrix of the BSE is now accounted for in the measurement design while the control input u is determined via a real-time calculation by the auto-pilot (or parallel model-based reconstruction).

In some systems, the use of an observer based BSE allows for the replacement of additional navigation elements. In some cases, the BSE replaces one or more of the following, a inertial measurement unit (IMU), an accelerometer, a gyroscope, an altimeter, and a magnetometer. This reduction in parts has benefits including a reduction in cost as well as a reduction in space and weight requirements.

One embodiment of the present disclosure is an observer-based design for bullet state estimation. The bullet translational dynamic equation of motion is written in the following state space description:

$$x(t)=A \cdot x(t)+B \cdot u(t)+G \cdot w(t) \tag{1}$$

$$y(t)=C \cdot x(t)+D \cdot u(t)+F \cdot v(t) \tag{2}$$

where the pair [A, B] governs the bullet dynamics, its nine state vector is described as follows, $x=[p_x\ p_y\ p_z | v_x\ v_y\ v_z | a_x\ a_y\ a_z]^T$ and the pair [C, D] governs the sensor measurement matrix. For the BSE of the present disclosure, the y(t) is measured by the RF/OI sensor whose measurements are "indirectly" related to the position vector. G is the input noise distribution matrix due to input disturbance w(t) entering the state equation, $E\{w \cdot w'\}=Q$ and F is the sensor noise input distribution matrix due to sensor measurement noise v(t), $E\{v \cdot v'\}=R$. The pair [G, F] and its associated inputs [w(t), v(t)] are addressable by the Extended Kalman Filter (EKF); however, two challenges for the BSE using the EKF framework are 1) how to select the process noise Qc (i.e., $Qc=G \cdot Q \cdot G'$) and 2) measurement noise R matrices (i.e., $Rc=F \cdot R \cdot F'$). The ability to address this noise is one main benefit of the system of the present disclosure.

In one embodiment, a dynamic observer-based design is used to estimate the bullet dynamics in flight by pre-processing the measurement vectors of an RF based seeker (or RF/OI) sensor (i.e., azimuth angle, elevation angle, and range measurements) and converting those measurements into a bullet position vector expressed in the Cartesian coordinate system. The converted measurement vector is now directly related to the BSE observer state vector, thus reducing the measurement linearization process of a typical estimator as a Jacobian matrix down to a linear time invariant (LTI) matrix. Next, the bullet state estimator (BSE) is solved by using the observer dynamic structure rather than the conventional EKF while factoring the control force vector as input. In some cases, this dramatically improves the BSE state vector estimation accuracy while eliminating the need of an ad-hoc selection for the process noise and the measurement noise covariance matrices (which are required by an EKF method).

It has been found that the observer based BSE design outperforms the conventional EKF design, especially in the velocity and acceleration estimation vectors. This is specifically needed for high roll dynamics estimation and control. This development is intended for at least guided bullet missions.

Figure 1:
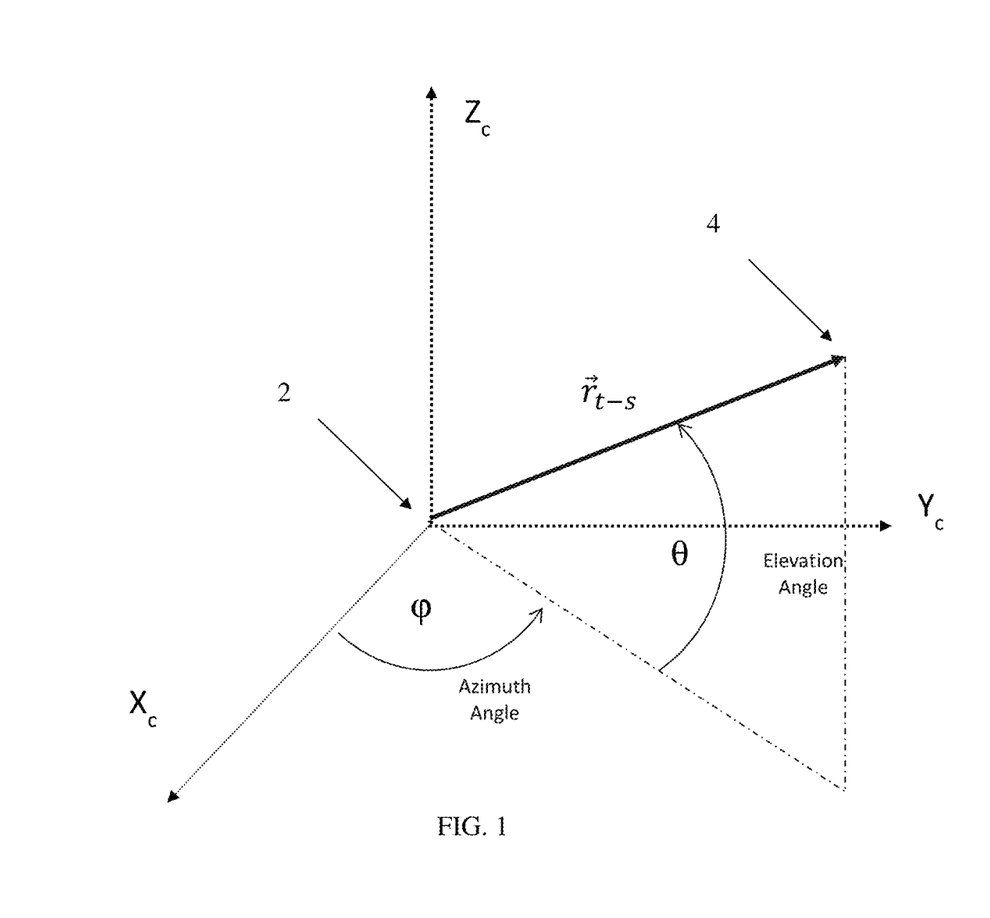
FIG. 1 is a diagram of one embodiment of the RF/OI sensor measurement pre-processing according to the principles of the present disclosure.

Referring to FIG. 1, a diagram of one embodiment of the measurement pre-processing for the RF/OI sensor according to the principles of the present disclosure is shown. More specifically, the RF/OI sensor measurements, i.e., azimuth angle, elevation angle, and range measurements are pre-converted to Cartesian coordinates as follows with equations (3a)-(3c):

$$p_x = r \cos \theta \cos \varphi \tag{3a}$$

$$p_y = r \cos \theta \sin \varphi \tag{3b}$$

$$p_z = r \sin \theta \tag{3c}$$

Under this conversion, the derived RF/OI sensor's measurements are now in the Cartesian coordinate system and thus become a direct linear combination of the bullet state vector (of the observer) for the position vector. As a result, when linearizing the measurement y with respect to the bullet state vector, the H matrix becomes constant. This essentially eliminates the Jacobian terms in the H matrix as used in a conventional EKF-based formulation. This leads to the observer-based BSE design of the present disclosure.

Still referring to FIG. 1, the RF/OI sensor 2 is generally mounted on a ground based fire control sensor center. In some cases, the sensors are on a tank, or the like. The projectile 4 is also shown in the figure with corresponding location information. In the figure, $\vec{r}_{(t-s)}$ is the range vector from bullet to sensor with two angles [φ, θ] as azimuth and elevation angles measurements, respectively.

In one embodiment, the dynamic observer model uses the pair [A, B] as its dynamics, with the initial value of its state estimate, and propagates the observer state to the next predicted cycle with the bullet control input u(t) and the measurement error correction compensated by the observer gain L (the term w(t) is taken care of in L).

$$x^{\hat{}}(t)=A \cdot x^{\hat{}}(t)+B \cdot u(t)+L(y(t)-y^{\hat{}}(t)) \tag{4}$$

The measurement y via the RF/OI measurements pre-conversion (eq. (3)) is written as follows, $$y(t) = C \cdot x(t) \quad (5)$$

where $C = [I_{3 \times 3} | 0_{3 \times 6}]$

The predicted measurement, $\hat{y}(t)$, is written as a function of the BSE observer state vector, $$\hat{y}(t) = C \cdot \hat{x}(t) \quad (6)$$

Substituting equations (5) and (6) into eq. (4), expanding it into the state space format, the observer (4) becomes, $$\hat{x}'(t) = [A - LC] \cdot \hat{x}(t) + B \cdot u(t) + L(y(t)) \quad (7)$$

In certain embodiments, the observer gain L matrix is designed using the following principle, $$L = P \cdot C^T V^{(-1)} \quad (8)$$

with P satisfying the following equation, $$A \cdot P + P \cdot A^T + W - P \cdot C^T \cdot V^{(-1)} \cdot C \cdot P = 0 \quad (9)$$

The process noise power spectral density W is selected as follows, $$W = W_0 + \mu^{(-1)} B \cdot W_1 \cdot B^T \quad (10)$$

where $W_0$ is the nominal process noise covariance and $W_1$ is the incremental process noise covariance.

Figure 2:
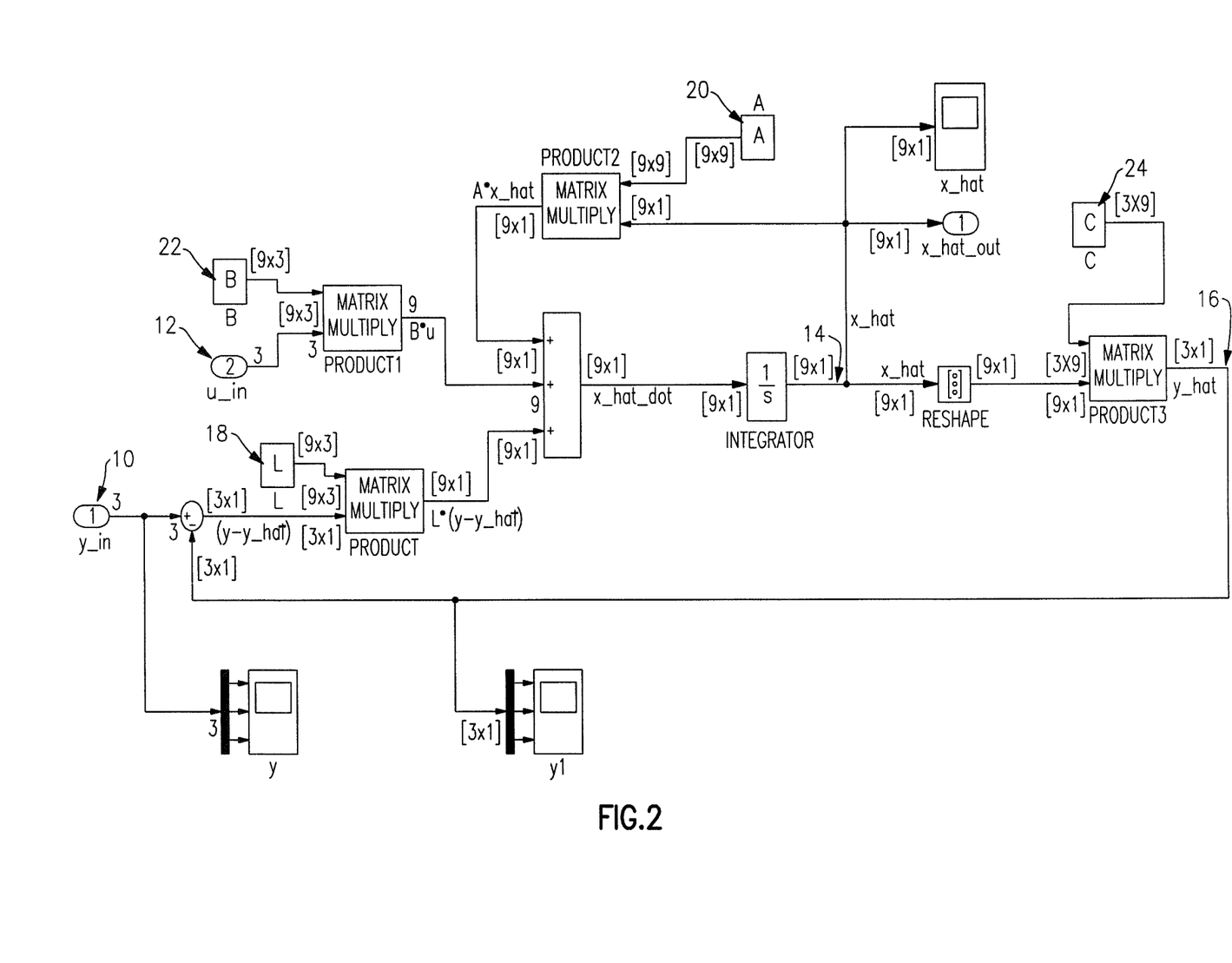
FIG. 2 shows a diagram of one embodiment of the system as modeled in Simulink according to the principles of the present disclosure.

Referring to FIG. 2, a diagram of one embodiment of the system as modeled in Simulink according to the principles of the present disclosure is shown. More specifically, the representative components in the figure are those used in equations (1) and (2), above. In one embodiment, for inputs, Y_in 10 comprises the RF/OI sensor measurements pre-converted to Cartesian coordinates and U_in 12 comprises the total force acting on the body. For outputs, X_hat 14 comprises the Bullet (9 elements) State Estimate vector. In some embodiments, the observer based BSE dynamic structure follows:

$$\dot{\hat{x}} = A\bar{x} + B\bar{u} + L(\bar{y} - \bar{\hat{y}})$$

$$\bar{\hat{y}} = C\bar{\hat{x}}$$

where X_hat 14 is the bullet state estimate vector; Y is the RF/OI sensor measurements in Cartesian coordinates; Y_hat 16 is the predicted measurements; and L 18 is the observer-based BSE gain matrix.

In certain embodiments, the system comprises an observer-based BSE dynamic matrix in a continuous time domain, where the dynamic matrix A 20 of the bullet state vector relative to the RF/OI sensor platform is written as follows, $$\begin{bmatrix} \dot{x} \\ \dot{y} \\ \dot{z} \\ \ddot{x} \\ \ddot{y} \\ \ddot{z} \\ \dddot{x} \\ \dddot{y} \\ \dddot{z} \end{bmatrix} = \begin{bmatrix} 0_{3 \times 3} & I_{3 \times 3} & 0_{3 \times 3} \\ 0_{3 \times 3} & 0_{3 \times 3} & I_{3 \times 3} \\ 0_{3 \times 3} & 0_{3 \times 3} & 0_{3 \times 3} \end{bmatrix} \begin{bmatrix} x \\ y \\ z \\ \dot{x} \\ \dot{y} \\ \dot{z} \\ \ddot{x} \\ \ddot{y} \\ \ddot{z} \end{bmatrix}$$

The B (input) matrix 22 relates the total input force to the acceleration; the B matrix is defined as:

$$B = \frac{1}{m} \begin{bmatrix} 0_{3 \times 3} \\ I_{3 \times 3} \\ 0_{3 \times 3} \end{bmatrix}$$

where m is the mass of the projectile.

The C 24 matrix maps the full state estimate to the estimated measured output, the C matrix is defined as: $C = [(I_{3 \times 3} \ 0_{3 \times 3} \ 0_{3 \times 3})]$, where the C 24 matrix is similar to the H matrix in the Kalman filter formulation such that by converting the sensor measurements to Cartesian coordinates, the Jacobian term is eliminated from the formulation and results in a liner time invariant (LTI) definition.

As defined, the pair [A, C] is observable for all 9 states, and the system is reduced to 6 states (pos, vel) to calculate the optimal feedback control gain, K. In one case, using built-in Matlab functions for state space control analysis K was calculated using a linear quadratic regulator (LQR) with identity weighing. The LQR algorithm is essentially an automated way of finding an appropriate state-feedback controller. The system was then augmented for all 9 states by appending $0_{3 \times 3}$ to K. The poles of the closed loop system (A−B*K) were calculated. L was created using the Matlab function "place" so that the poles of (A−L*C) were ½× the poles of the closed loop system (A−B*K).

The LTI rule of thumb states that the poles of (A−L*C) should be 4-10× the poles of (A−B*K) but this did not lead to good convergence. In certain embodiments, the gain ½ was found comparing state observer results to the true state generated by the equations of motion. The real part of the poles lies in the left hand side of the plane ensuring stability and convergence.

Figure 3:
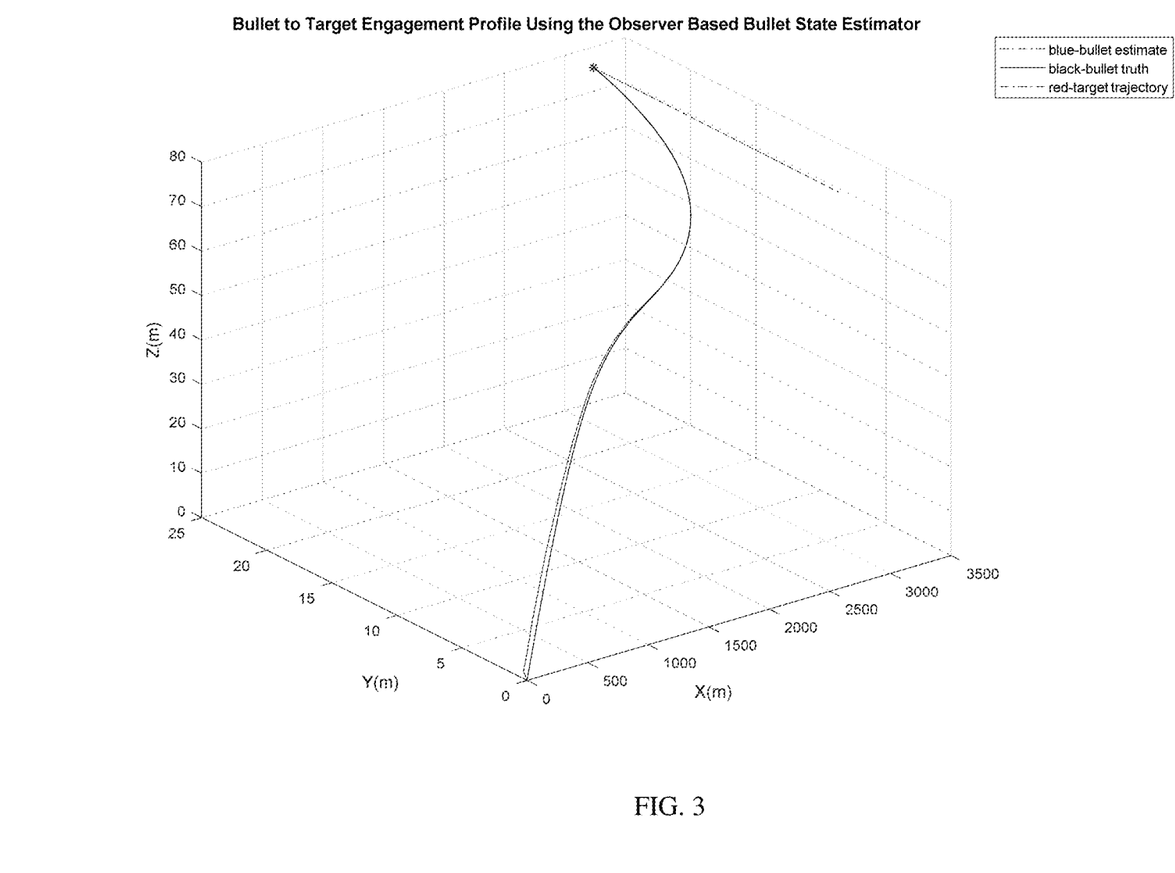
FIG. 3 shows one embodiment of a bullet to target engagement profile using the observer based bullet state estimator according to the principles of the present disclosure.

Referring to FIG. 3, a bullet to target engagement profile using the observer based bullet state estimator according to the principles of the present disclosure is shown. More specifically, the observer-based bullet state estimate according to the principles of the present disclosure match the truth data very closely. In one embodiment, the BSE position estimate error for x, 1 sigma was less than 1 m; the BSE position estimate error for y, 1 sigma was less than 0.5 m; and the BSE position estimate error for z, 1 sigma was less than 0.05 m. In one embodiment, the BSE velocity error for x, 1 sigma was less than 0.25 m; the BSE velocity error for y, 1 sigma was less than 0.025 m; the BSE velocity error for z, 1 sigma was less than 0.025 m.

The observer-based BSE design of the present disclosure is offering a better accuracy solution for the Guidance Law to compute its commanded acceleration actions to achieve a miss distance of <0.5 m circle error probable (CEP). This miss distance is needed for many missions since it offers broader miss distance margins that can be used to account for other error sources at the system level. One important design feature is lumped into the observer gain matrix L which accounts for both sensor uncertainty and process noise uncertainty.

Figure 4:
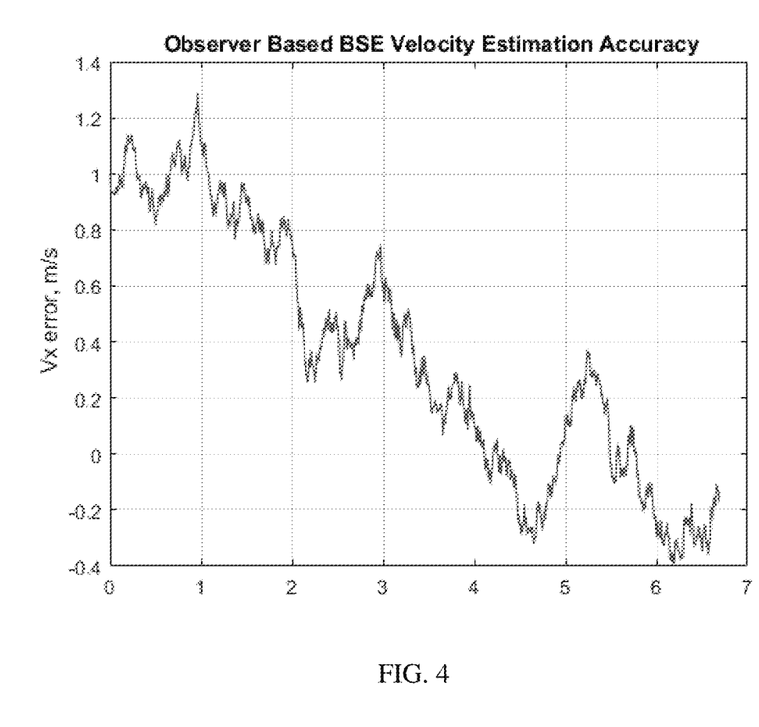
FIG. 4 shows one embodiment of the observer based bullet state estimate velocity accuracy in the x direction according to the principles of the present disclosure.
Figure 5:
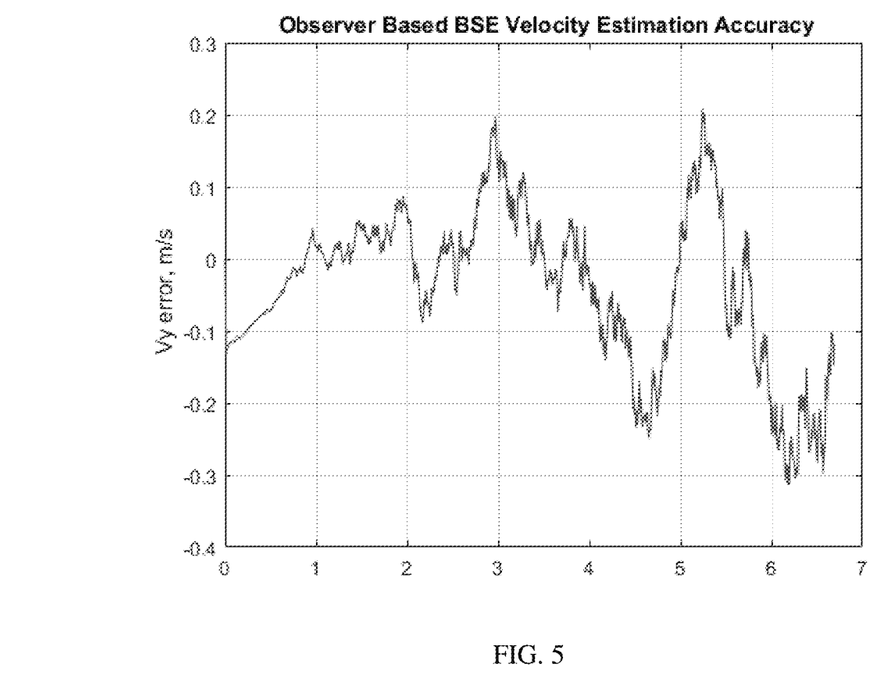
FIG. 5 shows one embodiment of the observer based bullet state estimate velocity accuracy in the y direction according to the principles of the present disclosure.
Figure 6:
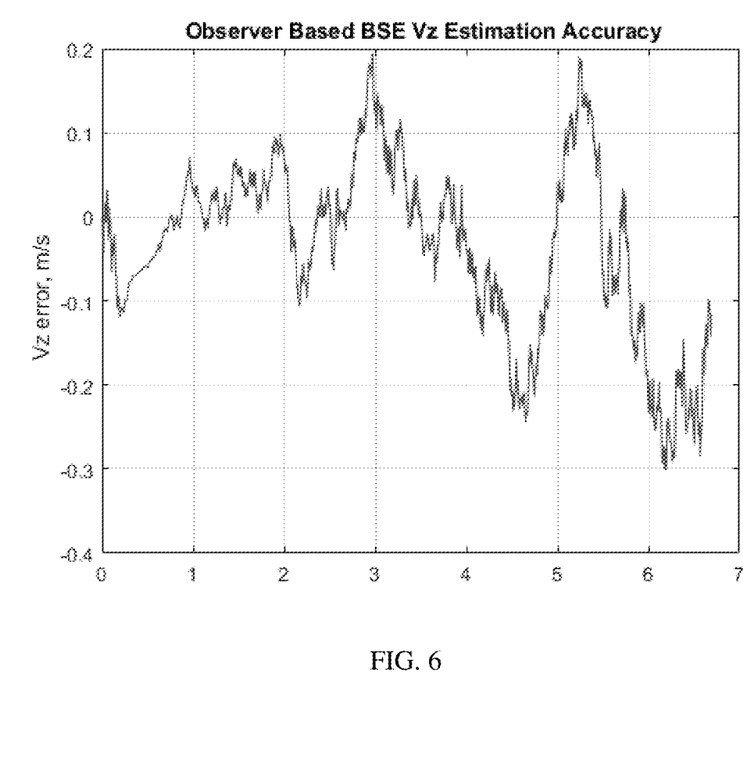
FIG. 6 shows one embodiment of the observer based bullet state estimate velocity accuracy in the z direction according to the principles of the present disclosure.

Referring to FIG. 4, one embodiment of the observer based bullet state estimate velocity accuracy in the x direction according to the principles of the present disclosure is shown. Referring to FIG. 5, one embodiment of the observer based bullet state estimate velocity accuracy in the y direction according to the principles of the present disclosure is shown. Referring to FIG. 6, one embodiment of the observer based bullet state estimate velocity accuracy in the z direction according to the principles of the present disclosure is shown. There, the error for the velocity measurement for each of the axes is less than 1 m/s.

Figure 7:
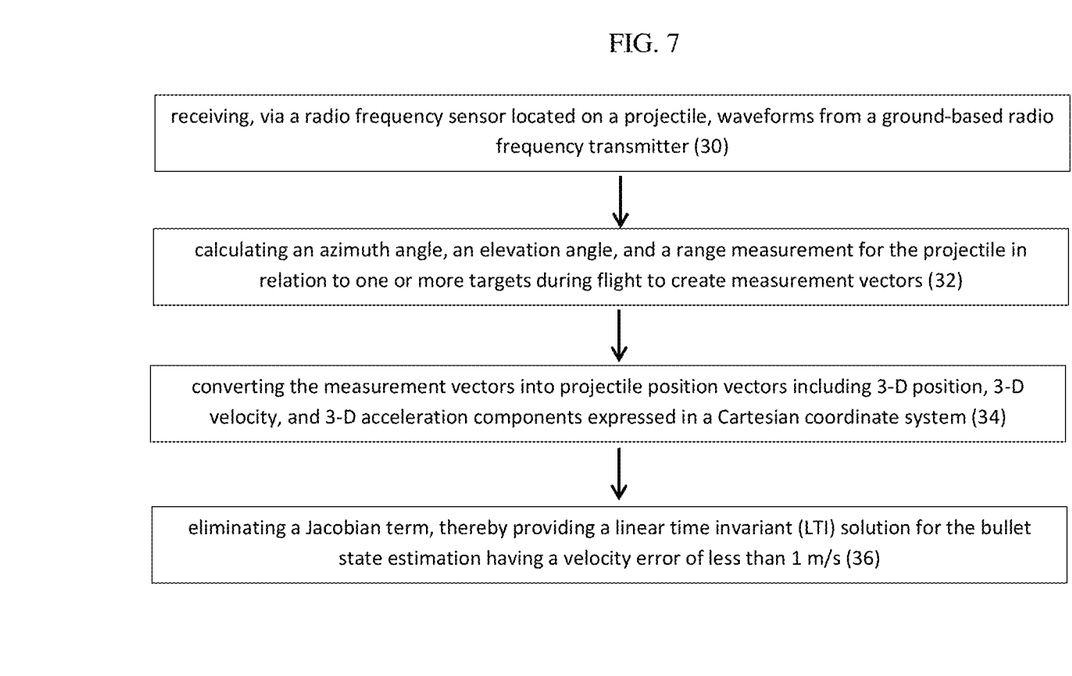
FIG. 7 shows one embodiment of a method according to the principles of the present disclosure.

Referring to FIG. 7, one embodiment of the method of the present disclosure is shown, More particularly, a method for observer-based bullet state estimation, comprises receiving, via a radio frequency sensor located on a projectile, waveforms from a ground-based radio frequency transmitter (30). An azimuth angle, an elevation angle, and a range measurement is calculated for the projectile in relation to one or more targets during flight to create measurement vectors (32). The measurement vectors are converted into projectile position vectors including 3-D position, 3-D velocity, and 3-D acceleration components expressed in a Cartesian coordinate system (34) and Jacobian terms are eliminated, thereby providing a linear time invariant (LTI) solution for the bullet state estimation having a velocity error of less than 1 m/s (36).

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application observer based program can be loaded to, and executed by, an on-board or off-board processor as part of the fire control architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method for observer-based bullet state estimation, comprising
receiving pre-processing information, via a radio frequency sensor located on a projectile or bullet, the pre-processing information involving waveforms from a ground-based radio frequency transmitter;
calculating using the pre-processing information an azimuth angle, an elevation angle, and a range measurement for the projectile or bullet in relation to one or more targets during flight to create projectile or bullet measurement vectors;
converting the projectile or bullet measurement vectors into projectile or bullet position vectors including 3-D position, 3-D velocity, and 3-D acceleration components expressed in a Cartesian coordinate system; and
eliminating a Jacobian term from the projectile or bullet position vectors, thereby providing a linear time invariant (LTI) solution for the bullet state estimation having a velocity error of less than 1 m/s.

2. The method for observer-based bullet state estimation according to claim 1, wherein elimination of measurement noise and process noise covariance matrices is part of the estimation process.

3. The method for observer-based bullet state estimation according to claim 1, wherein the azimuth angle, the elevation angle, and the range measurements are pre-converted to Cartesian coordinates as follows: $p_x = r \cos\theta \cos\varphi$, $p_y = r \cos\theta \sin\varphi$, and $p_z = r \sin\theta$.

* * * * *